Figure 1:
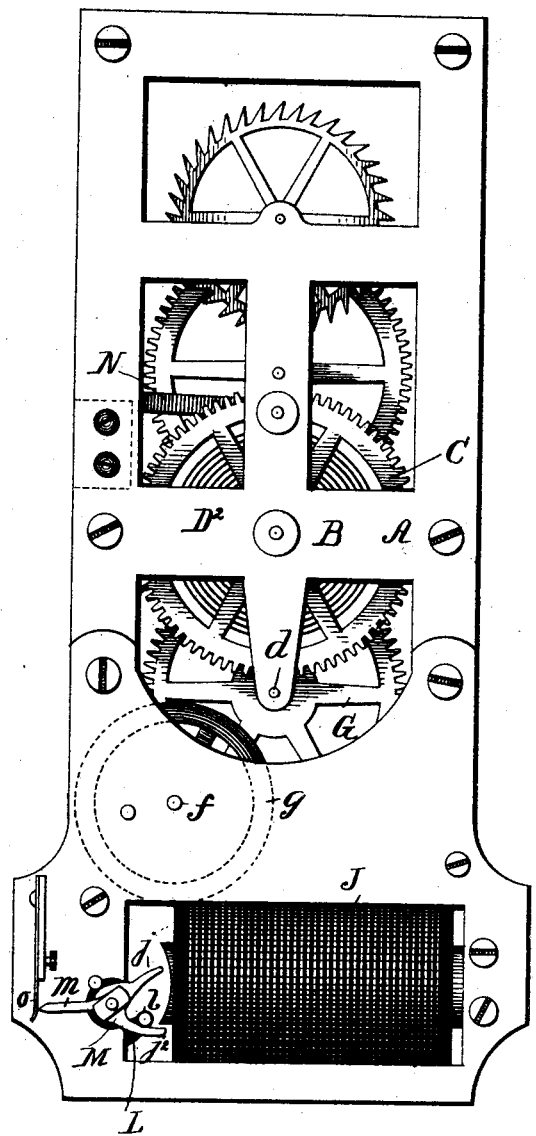
Figure 2:
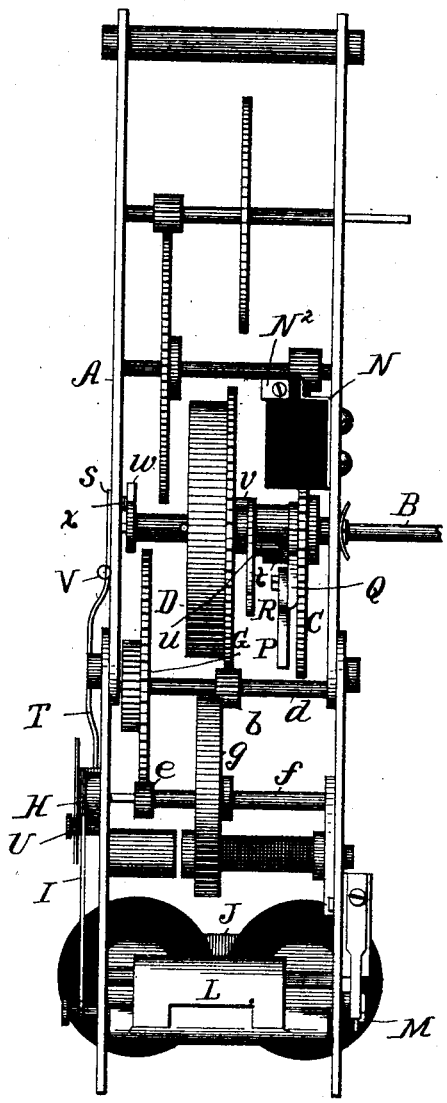

(No Model.) 4 Sheets—Sheet 1.

F. M. SCHMIDT.
SELF WINDING ELECTRIC CLOCK.

No. 502,935. Patented Aug. 8, 1893.

Witnesses
W. H. Courtland
M. V. Bidford

Inventor
Frederick M. Schmidt
By Wilmere Arwer
Attys.

(No Model.) 4 Sheets—Sheet 2.
F. M. SCHMIDT.
SELF WINDING ELECTRIC CLOCK.
No. 502,935. Patented Aug. 8, 1893.
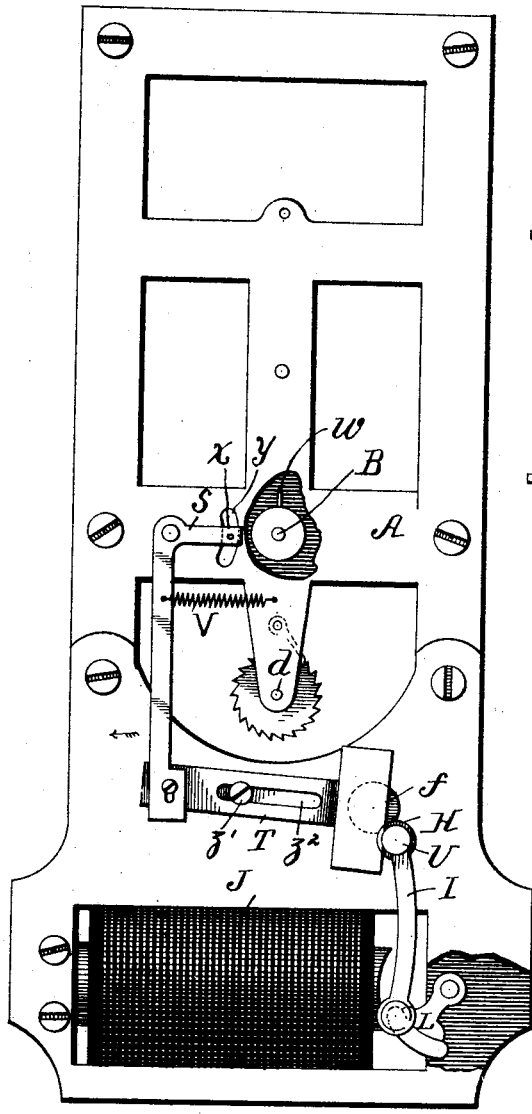
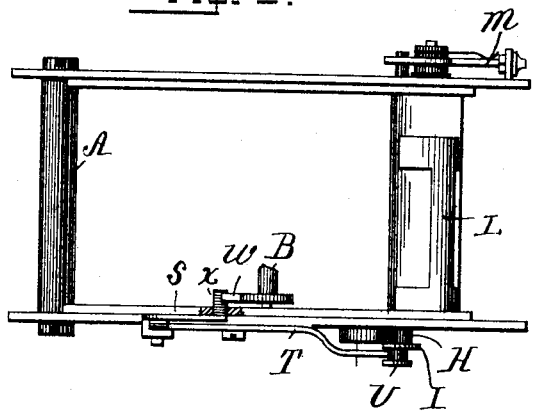
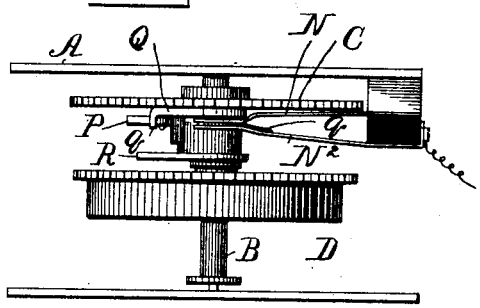
Witnesses
W. H. Courtland
M. V. Bidgood
Inventor
Frederick M. Schmidt
By Whittere & Gruner
Attys (No Model.) 4 Sheets—Sheet 3.
F. M SCHMIDT.
SELF WINDING ELECTRIC CLOCK.
No. 502,935. Patented Aug. 8, 1893.
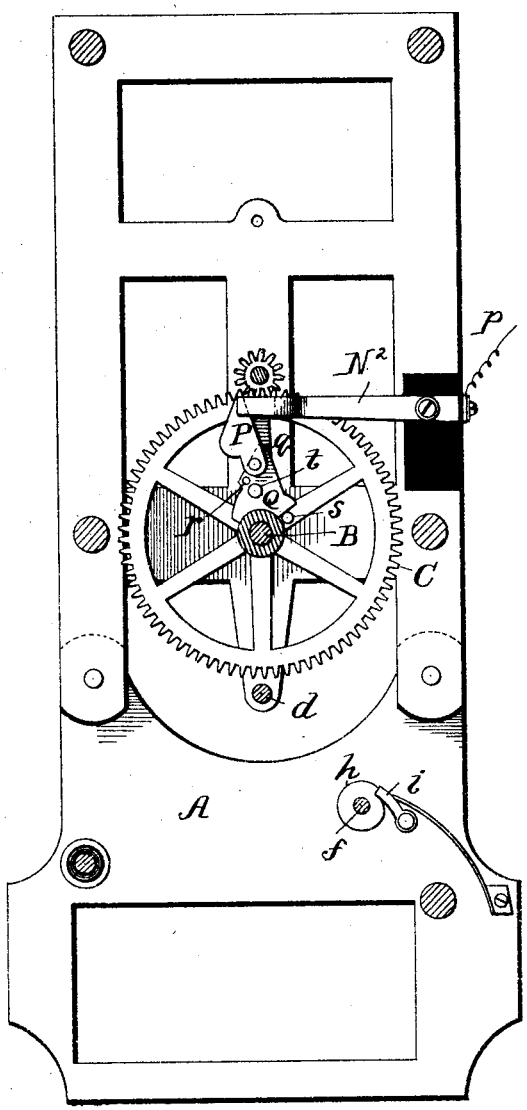
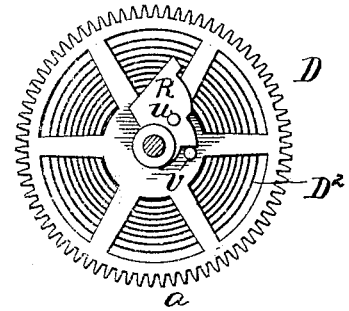
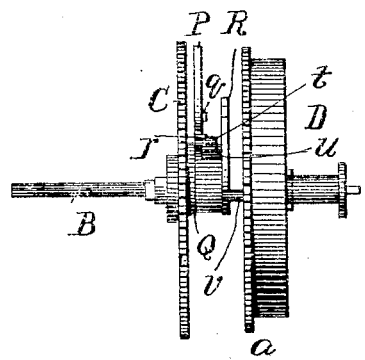
Witnesses
Wm H. Courtland
M. T. Bidgood
Inventor
Frederick M. Schmidt,
By Witmere Gruner
Attys.

(No Model.) 4 Sheets—Sheet 4.
F. M. SCHMIDT.
SELF WINDING ELECTRIC CLOCK.
No. 502,935. Patented Aug. 8, 1893.
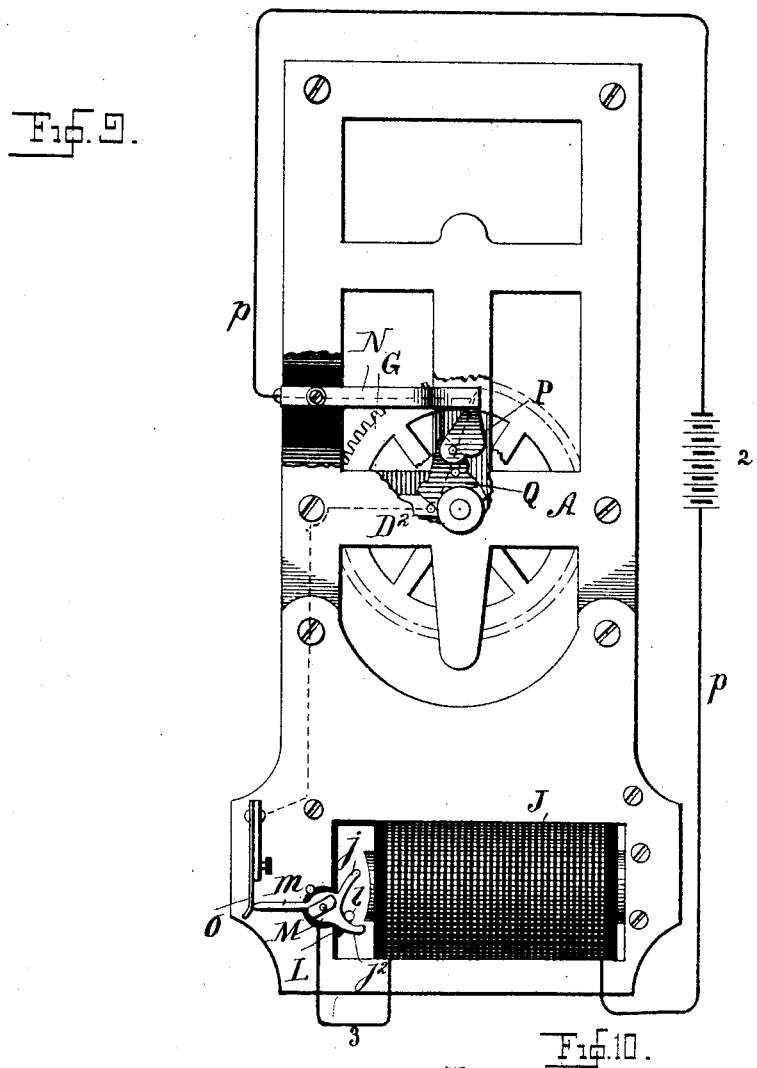
Fig. 9.
Fig. 10.
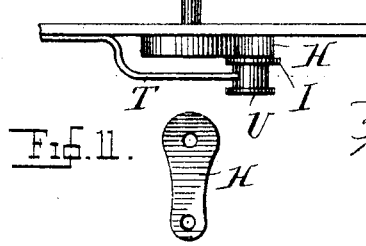
Fig. 11.
Witnesses
Wm H Courtland
M. V. Bidgood
Inventor
Frederick M. Schmidt
By Watson & Jenner
Attys.

United States Patent Office.

FREDERICK M. SCHMIDT, OF BROOKLYN, ASSIGNOR TO THE SELF WINDING CLOCK COMPANY, OF NEW YORK, N. Y.

SELF-WINDING ELECTRIC CLOCK.

SPECIFICATION forming part of Letters Patent No. 502,935, dated August 8, 1893.

Application filed January 19, 1893. Serial No. 458,911. (No model.)

*To all whom it may concern:*

Be it known that I, FREDERICK M. SCHMIDT, a citizen of the United States, residing at Brooklyn, county of Kings, State of New York, have invented certain new and useful Improvements in Electric Self-Winding Clocks, of which the following is a specification.

The present invention relates to that class of clocks, which are provided with an electric motor, thrown periodically into operation by the action of the clock itself, for rewinding the clock spring, and the present invention has for its object to improve the means for winding the main spring, and to insure the proper breaking of the electric circuit as soon as the spring has been wound sufficiently.

Another object of the invention is to guard against the crank of the winding mechanism remaining on the dead center at the moment the magnets of the motor are energized.

A further object of the invention is to improve and simplify the several parts and connections for the spring winding mechanism.

The invention consists in the novel details of improvement and the combinations of parts that will be more fully hereinafter set forth and then pointed out in the claims.

Reference is to be had to the accompanying drawings forming part hereof, wherein—

Figure I is a side elevation of a self winding clock mechanism containing my improvements. Fig. II is an edge view thereof. Fig. III is a side elevation of the clock mechanism partly broken, looking from the side opposite that shown in Fig. I. Fig. IV is a plan view of the clock frame, omitting the clock mechanism, showing a portion of my improvements, part being in section. Fig. V is a plan view showing the winding drum and hour wheel, and my improved circuit closers that co-act therewith. Fig. VI is a side elevation of the mechanism, one side of the frame being removed, showing the circuit closers in the positions they assume when the spring is being rewound. Fig. VII is a side view of the spring drum, showing the means for breaking the circuit at the proper time, and Fig. VIII is an edge view of the hour wheel and spring drum, showing their connection with my improved circuit closers. Fig. IX is a partly broken side elevation of the clock, showing the circuit for the magnet. Fig. X is a detail edge view of the winding crank, and Fig. XI is a face view thereof.

Referring now to the accompanying drawings, the letter A indicates the main frame of the clock mechanism which may be of suitable construction. B is the hand arbor, C the hour wheel and D the spring drum or going barrel containing main spring $D^2$ all of which parts, together with the train of gearing may be of suitable construction, not forming part of my present invention excepting in so far as the wheel C and drum D co-act with my improvements.

The toothed wheel $a$ connected with the spring drum (or broadly speaking, with the main spring $D^2$) meshes with a pinion $b$ on an arbor $d$ journaled in frame A, whereby when pinion $b$ is turned by the motor (hereinafter described) the drum D will be turned to wind the main spring $D^2$. On the arbor $d$ is a toothed wheel G that meshes with a pinion $e$ on an arbor $f$ journaled in frame A and preferably carrying a fly wheel $g$ to regulate the rotation of the parts. The arbor $f$ preferably carries a projecting cam $h$ engaged by a pawl $i$ to prevent reverse movement of said arbor (see Fig. VI). The arbor $f$ is to be turned to wind the main spring $D^2$, by a motor, preferably electric, and for this purpose carries a crank H that is connected by a pitman I with the actuating part of the motor. In the example shown, the motor consists of a magnet or magnets J and armature L (with a suitable electric generator, say a battery 2, and connections). The armature shown is of the oscillating variety and is pivotally carried in frame A, and arranged to be attracted by magnet J in well known manner. The pitman I is pivotally connected with the armature L so that as the armature oscillates the pitman will act to turn crank H, and thereby rotate arbor $f$ to wind the spring $D^2$ while the fly wheel $g$ acts to continue the winding as the armature retreats from the magnet.

As the armature L oscillates, the circuit through magnet J is alternately broken and closed as follows (see Figs. I and IX): M is an oscillating lever arm or escapement that is pivotally carried by frame A but insulated therefrom. One end of lever or escapement M is preferably bifurcated forming prongs $j$, $j^2$ between which an insulated projection $l$, carried by armature L freely passes. The end $m$ of lever or escapement M is adapted to alternately make and break connection with a contact or strip $o$ carried by frame A, and preferably in electrical contact therewith, whereby said frame may form part of the electrical circuit. The lever or escapement M is in electrical connection with the magnet J by wire 3 thereby being included in the circuit. The projection $l$ normally holds lever or escapement M in such position that it will engage contact $o$ and thus establish a normally closed circuit at that point. Now, when magnet J is energized (as hereinafter specified) and attracts armature L, the projection $l$ will rise and engage prong $j$ of lever or escapement M, thereby turning the latter slightly and disengaging the part $m$ from contact $o$, thus breaking the circuit. The armature L now descends and its projection $l$ next engages prong $j^2$ of lever or escapement M, thereby restoring part $m$ of lever M to engagement with contact $o$, to re-establish the circuit, and so on alternately as the armature L oscillates.

From the foregoing, it will be understood that when circuit is closed through magnet J, armature L will oscillate to make and break the circuit while at the same time the crank H will be turned to wind the main spring.

The manner of closing the main circuit through magnet J at the proper time, is as follows:—One terminal of magnet J may be connected with the line circuit $p$ direct, while the frame A may be connected to the other wire of the line circuit, but the manner of establishing the line circuit may be varied as desired. To the frame A (or otherwise included in the circuit) is connected a contact strip N. A corresponding strip $N^2$ (see Fig. V) carried by frame A but insulated therefrom, connects with the line wire $p$ (see Figs. VI and IX). The strips N, $N^2$ are arranged in pairs but are prevented from making contact by insulation $q$, carried by one strip (see Fig. V). Electrical connection is established between strips N and $N^2$ at the proper moment, by means of a contact or the like P, that is passed between said strips or contacts by means of the hour wheel C, whereby the circuit will be established from battery 2 through wire $p$ to strip $N^2$, contact P to the frame A, contact $o$, lever M, wire 3, magnet J and wire $p$ to the battery 2. The contact P is preferably pivotally carried by an arm or the like Q that is loosely hung on the arbor B (see Fig. VI). The arm Q carries a projection or toe $q$ that is adapted to engage contact P to lift it into the position to pass between and make contact with strips N and $N^2$ when the wheel C arrives at the position desired for winding the main spring $D^2$. A pin or projection $r$ on arm Q limits the movement of contact P on its pivot when it passes from between strips N, $N^2$. By this means also, if the wheel C should by any chance move in the reverse direction from that intended, the dog P will rest on pin $r$ so as not to be in position to pass between strips N, $N^2$. The arm Q is turned at the proper moment by wheel C and for this purpose a pin or projection $s$ on wheel C engages arm Q, to carry contact P between strips N, $N^2$.

In order that the contact P will not remain so long between the strips N, $N^2$ (on account of the slow movement of wheel C) that the spring $D^2$ would be wound too tight, I provide means to permit the drum or going barrel D to move contact P from contact with strips N, $N^2$ while at the same time permitting the spring $D^2$ to be wound as much as necessary. For this purpose the arm Q carries a pin or the like $t$ that is adapted to be engaged by a pin or projection $u$ movably connected with drum D. For this latter purpose the pin $u$ is carried by an arm R hung loosely on arbor B (see Fig. VII). The arm R is turned by a pin or the like $v$, connected with wheel $a$ or drum D. Now, when dog P has been brought into contact with strips N, $N^2$ by wheel C, and the circuit is thus established through magnet J, the motor and connections before described will turn drum D, and cause pin $u$, to engage pin $t$ to carry contact P away from strips N, $N^2$ to break the circuit and stop the winding as soon as the spring $D^2$ has been wound sufficiently. By means of the loose or movable connection between contact P and wheel C, said contact can be moved quickly away from strips N, $N^2$ by arm R when the main spring is sufficiently wound to suddenly break contact at that point. This is essential on account of the slow movement of wheel C. As the pin $u$ is carried on the independently movable arm R, the drum D is permitted further rotation in winding than it would be (before the circuit breaks) if the pin $u$ were rigidly connected with it.

To overcome the danger of the crank H being on the dead center when the circuit is first established through the magnet J, I place on the arbor B, a projection $w$ that is adapted to operate upon a lever S or an extension $x$ thereof (see Figs. III and IV). The lever S is preferably angle-shaped, and hung on the outer side of frame A, its extension $x$ passing through an opening $y$ in frame A (see Fig. III). To lever S is pivotally connected a sliding bar T, suitably supported on frame A, say by means of a pin or screw $z$ on frame A passing through a slot $z^2$, in bar T, or otherwise. The free end of bar T (which is preferably elongated or widened as in Fig. III) abuts against the pitman I, or a wearing piece or extension U thereof, (see Figs. III, IV and X.) A spring V connecting lever S with frame A, serves to hold bar T in contact with extension U of pitman I. With this arrangement, the bar T will normally hold the crank off of the dead center and when the motor operates to wind main spring $D^2$ the projection $w$ will bear upon extension $x$ of lever S and press it down, thereby moving the outer end of lever S in the direction of the arrow in Fig. III, thus withdrawing bar T from pitman I, distending spring V and holding arm T away from the crank. When the spring has been sufficiently wound, projection $w$ will pass from extension $x$ of lever S and thus allow spring V to draw lever S. Bar T will now be suddenly and with force, projected against extension U of pitman I thus carrying the crank H away from the dead center, whereupon the armature L is left free to oscillate the next time the circuit establishes through magnet J.

A brief summary of the complete operation of my improvements may be outlined as follows:—Suppose it is desired that the main spring be rewound once every hour: the pins $s$, $t$ and $u$ will be so located that at the end of each hour the contact P will be brought into engagement with strips N, $N^2$ to close the electric circuit through magnet J, the lever M being normally in contact with strip $o$. (The main spring $D^2$ may now have about run down.) Armature L will now oscillate to drive shaft $f$ and by means of pinions $e$, $b$ and wheels G, $a$, the drum D will turn to wind the spring $D^2$. This will continue until spring $D^2$ is sufficiently wound, whereupon pin V of drum D will have arrived at such a position as to cause pins $t$ and $w$ to engage, whereupon contact P, will be carried away from strip $N^2$, thus breaking the main circuit through magnet J and stopping the motor.

It will be understood that if the strip $N^2$ only were used the circuit would be established at P, $N^2$, as the contact P is normally in the circuit, while the strip $N^2$ is normally insulated therefrom. But by my new circuit controlling mechanism, the current need not pass through any oil holes or any revolving members of the clock train. It completes the circuit direct through N, $N^2$ thus avoiding trouble from bad contacts derived from gummy or dirty oil. The contact P acts as a plug between the two contact springs N, $N^2$ by passing between them, completing the battery circuit. It will be understood that contact N may be disconnected from the frame and the circuit completed between P and $N^2$ direct.

My device combines all the features of a perfect electric contact such as long life, giving a wiping contact and a drop make and break. There is no liability of its becoming disarranged when once set up. Another valuable feature is the loose contact P on the center arbor; it being set eccentric it will pass under center contact springs without doubling them up if for any reason the train should have reversed. Long experience has proved oily and gummy contacts to be a very objectionable feature of controlling devices used heretofore.

By means of the oscillating armature and the crank H, I am enabled to obtain a positive and quick acting mechanism for winding the clock spring, without danger of the parts becoming deranged.

I would observe that the electrical circuits and connections may be arranged as desired.

Having thus described my invention, the following is what I claim as new therein and desire to secure by Letters Patent:

1. In a self winding clock, the combination of the going barrel, a spring drum and an electric motor having an oscillating or reciprocating armature, a rotative crank connected therewith, and mechanism between said crank and said going barrel for turning the latter by the former, substantially as described.

2. In a self winding clock, a motor comprising a magnet, and armature, and a rotative crank connected with the latter, combined with winding mechanism between said crank and the drum or going barrel and with a circuit closer controlled by the hour wheel or arbor, substantially as described.

3. In a self winding clock, a motor comprising a magnet and armature, a circuit controller actuated by said armature, a rotative crank also actuated by said armature and mechanism between said crank and the going barrel for driving the latter by the former, and a circuit closer actuated by the hour wheel or arbor to close the circuit for said magnet, substantially as described.

4. In a self winding clock, an electric motor and connections therefor, combined with a contact to be actuated by the train of gearing, an arm hung loosely on an arbor of the train of mechanism, said contact being pivotally carried by said arm, a projection for holding said contact in the operating position, a contact $N^2$ to be engaged by said other contact to close the circuit through the motor and means for carrying said contact away from said contact $N^2$, substantially as described.

5. In a self-winding clock, an electric motor and connections therefor, combined with a contact P, a loosely hung arm to which said contact is pivoted, a contact $N^2$ in the circuit to be engaged by said contact P, a loosely hung arm and connections between it and the spring drum or going barrel for moving one by the other, and with connections between said arms, for moving the contact-carrying arm by the other arm, substantially as described.

6. In a self winding clock, an electric motor and a crank connected therewith for winding the main spring of the clock combined with means for throwing said crank from the dead center, substantially as described.

7. In a self winding clock, an electric magnet and armature and a crank connected therewith for winding the clock main spring combined with means for throwing said crank from the dead center, substantially as described.

8. In a self winding clock, an electric motor and connections therefor, combined with a crank connected with said motor for winding the clock spring, a lever for throwing said crank from the dead center, and means connected with the clock train for tripping said lever to move said crank, substantially as described.

9. In a self winding clock, an electric motor and connections therefor, combined with a crank connected therewith for winding the clock spring, a lever to throw the crank from the dead center, a projection connected with the clock train to co-act with said lever to trip the latter, and a spring to move said lever, substantially as described.

10. In a self winding clock, the combination of an electric motor and a crank connected therewith, a lever S, a projection connected with the clock train to trip said lever, a spring to move said lever and a bar R connected with said lever and acting on said crank to throw it from the dead center, substantially as described.

11. In a self winding clock an electro-magnet and armature and a crank connected therewith for winding the clock main spring combined with gearing between said spring and said crank and a fly wheel for continuing the winding while the armature retreats from the magnet, substantially as described.

FREDERICK M. SCHMIDT.

Witnesses:
L. WOOLSEY,
M. V. BIDGOOD.